(12) United States Patent
Bynum

(10) Patent No.: US 7,443,805 B1
(45) Date of Patent: Oct. 28, 2008

(54) METHOD AND SYSTEM FOR ADJUSTING THE CONFIGURATION OF DEVICES IN A WIRELESS COMMUNICATION SYSTEM

(75) Inventor: John Christopher Bynum, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1012 days.

(21) Appl. No.: 10/358,805

(22) Filed: Feb. 5, 2003

(51) Int. Cl.
*H04L 12/28* (2006.01)

(52) U.S. Cl. .............. 370/254; 370/310; 370/339; 370/465

(58) Field of Classification Search .......... 370/241, 370/247, 250, 251, 252, 254, 310, 339, 465; 455/67.7, 67.11, 226.1, 226.2, 226.3, 226.4
See application file for complete search history.

(56) References Cited

U.S. PATENT DOCUMENTS

| | | | |
|---|---|---|---|
| 4,751,510 A * | 6/1988 | de Saint Michel et al. | 340/3.31 |
| 5,341,147 A * | 8/1994 | Scott | 342/360 |
| 5,761,614 A * | 6/1998 | Leitch et al. | 455/254 |
| 6,801,790 B2 * | 10/2004 | Rudrapatna | 455/562.1 |
| 6,980,782 B1 * | 12/2005 | Braun et al. | 455/277.2 |
| 7,035,594 B2 * | 4/2006 | Wallace et al. | 455/67.12 |
| 7,120,431 B1 * | 10/2006 | Huo et al. | 455/423 |
| 7,123,893 B1 * | 10/2006 | Austin et al. | 455/278.1 |
| 2003/0143946 A1 * | 7/2003 | Grzeczkowski | 455/3.05 |
| 2003/0157943 A1 * | 8/2003 | Sabat, Jr. | 455/456 |

OTHER PUBLICATIONS

Willtech International, "BlueRose Features and Overview", Jan. 16, 2002, p. 1-108.
Grayson Wireless, Invex3G Wireless Measurement Solutions Hardware Manual, 2001.

* cited by examiner

*Primary Examiner*—Chi H. Pham
*Assistant Examiner*—Shick Hom (57) ABSTRACT

A method and system for adjusting the configuration of devices in a communications system is provided. An engineer may perform a test of the configuration of a device in a system by using a diagnostic measurement device (DMD). The engineer (or the DMD) may then establish a test result. The test result may indicate any adjustments that are necessary to the configuration of the device to optimize the configuration of the device and the system. The engineer may then cause the DMD to wirelessly send a control signal to the device's controller, causing the device's controller to make the necessary adjustments to the configuration of the device. The engineer may then verify the adjustments made by performing a second test and then possibly sending another wireless signal to the device's controller to reconfigure the device's configuration accordingly.

10 Claims, 9 Drawing Sheets

METHOD AND SYSTEM FOR ADJUSTING THE CONFIGURATION OF DEVICES IN A WIRELESS COMMUNICATION SYSTEM

FIELD OF INVENTION

The present invention relates to wireless communications, and more particularly, to a method and system for adjusting the configuration of devices in a wireless communications system.

BACKGROUND

Wireless communication is an increasingly popular means of communication in the modern world. People are using wireless networks for the exchange of voice and data as an alternative to using a wired infrastructure. In principle, a user can seek information over the Internet or call anyone over a public switched telephone network (PSTN) from any place inside a coverage area of a wireless network.

In a typical wireless network, an area is divided geographically into a number of cell sites, each defined by one or more radiation patterns created by an emission of radio frequency (RF) electromagnetic waves from a respective base transceiver station (BTS) antenna. For wireless communications, RF signals are not sent through a transmission line and, therefore, antennas are required for the transmission and reception of the signals.

Unfortunately, however, buildings, tunnels, or other areas that block RF signals may obstruct the transmission and reception of RF signals. To overcome this problem, a distributed antenna system (DAS) may be used to bring RF coverage inside and throughout a facility, underground (for example, within tunnels), or anywhere that outdoor RF signals do not reach.

A DAS may comprise, for example, any network of components that receives an input RF signal, converts it to wired (e.g., copper wire, optical, coax, etc.) or possibly wireless media, transports it throughout a facility, and then re-converts it back to an RF signal for transmission inside the facility. By way of example, a DAS may comprise multiple antennas positioned throughout a building (or other RF-blocked areas), interconnected through remote hubs using fiber-optic cables. The DAS may also include a distributed antenna system controller (DASC) connected to the remote hubs using for example, fiber-optic cables. The DASC receives wireless signals from a BTS and converts the wireless signals into optical signals. The fiber optic cables then distribute the optical signals from the DASC to the remote hubs, which send the signals to the antennas throughout the building. The antennas receive the optical signals and convert them back to RF signals for wireless transmission inside the building.

SUMMARY

To configure a DAS (or any wireless communication system arrangement), the arrangement of the antennas and the configuration of each antenna should be optimized to provide a most favorable coverage area within the building or other coverage areas. Diagnostic equipment may perform a test to obtain operational parameters of the DAS (or wireless communication system), which the diagnostic equipment can then use to establish an optimal arrangement and configuration of the antennas. The diagnostic equipment may obtain various known operational parameters of a system. For example, a quality of communication, a receive power, a transmit power, and a frame error rate (FER) can be recorded.

To collect the operational parameters, an engineer, or any operator, may position the diagnostic equipment within the coverage areas of each antenna in the DAS and measure signal power levels and/or calculate signal error rates. Additionally, the engineer may also go to each antenna location and physically connect the diagnostic equipment to the antenna to capture other transmission data. If analysis shows that the antenna requires reconfiguration, the engineer may make adjustments at the DASC or the remote hubs of a DAS, or at the antenna controllers of other wireless communication systems by physically connecting a computer to these components and uploading configuration parameters. Within a DAS, the engineer may make adjustments at the DASC, which may be located in the basement of the building.

Unfortunately, however, after uploading new parameters into the equipment, the engineer may desire to verify the settings and, thus would have to re-position the diagnostic equipment within the coverage areas to collect data. Subsequently, if any additional reconfigurations are still necessary, the engineer would have to return to the locations of the equipment (e.g., the basement) to upload or modify the configurations. Consequently, the process of collecting data from and reconfiguring each antenna of a wireless communication system, such as a DAS, could become burdensome and time consuming particularly if the DAS is very large (possibly spanning an entire building that has several floors, for instance).

The present invention provides an improved mechanism for adjusting the configuration of devices in a communication system. In an exemplary embodiment, the mechanism may take the form of a method that can be performed within a communications system that includes at least one device and a device controller that controls the at least one device. The method may include performing a test of a configuration of the at least one device and establishing a test result. The method may also include, in response to the test result, wirelessly sending a control signal to the device controller, causing the device controller to adjust the configuration of the at least one device. The method may further include performing a second test of the configuration of the at least one device to verify the reconfiguration of the at least one device.

In another aspect, the exemplary embodiment may take the form of a diagnostic measurement device, which may adjust a configuration of at least one device in a communications system. The diagnostic measurement device may include a processing unit and instructions stored in data storage executable by the processing unit to perform a test of the configuration of the at least one device and to establish a test result. The diagnostic measurement device may also include a wireless interface that is operable to communicate with a device controller that controls the at least one device. In response to the test result, the wireless interface is operable to wirelessly send a control signal to the device controller, causing the device controller to adjust the configuration of the at least one device.

In still another aspect, the exemplary embodiment may take the form of a distributed antenna system (DAS). The DAS may include a plurality of antennas and a distributed antenna system controller (DASC) coupled to the plurality of antennas. The DASC may be operable to receive a wireless control signal causing the DASC to adjust a configuration of the DAS.

The present invention allows for remote wireless reconfiguration of a device/system under test, and therefore, allows for a field technician to adjust a configuration without having to physically return to a remotely located control-entity.

These as well as other features and advantages of the method and system for adjusting the configuration of devices in a wireless communication system will become apparent to those of ordinary skill in the art by reading the following detailed description, with appropriate reference to the accompanying drawings.

BRIEF DESCRIPTION OF FIGURES

Reference is made to the attached figures, wherein like reference numerals refer to like elements in the various figures, and wherein.

DETAILED DESCRIPTION OF EXEMPLARY EMBODIMENTS

According to an exemplary embodiment of the present invention, an engineer may remotely communicate with devices of a telecommunication system by using a wireless interface, rather than by physically connecting to the devices of the system. For example, in a distributed antenna system (DAS), a device controller, such as the DASC, may control devices within the DAS, such as remote hubs and antennas, and diagnostic equipment may perform a test of the configuration of the devices and wirelessly send a control signal to the device controller, causing the device controller to automatically adjust the configuration of the devices according to results of the test. Similarly, an engineer may remotely communicate in this manner with other devices of a telecommunications system, such as with a repeater or with base station transmitters and receivers, for example.

A. Wireless Network

Figure 1:
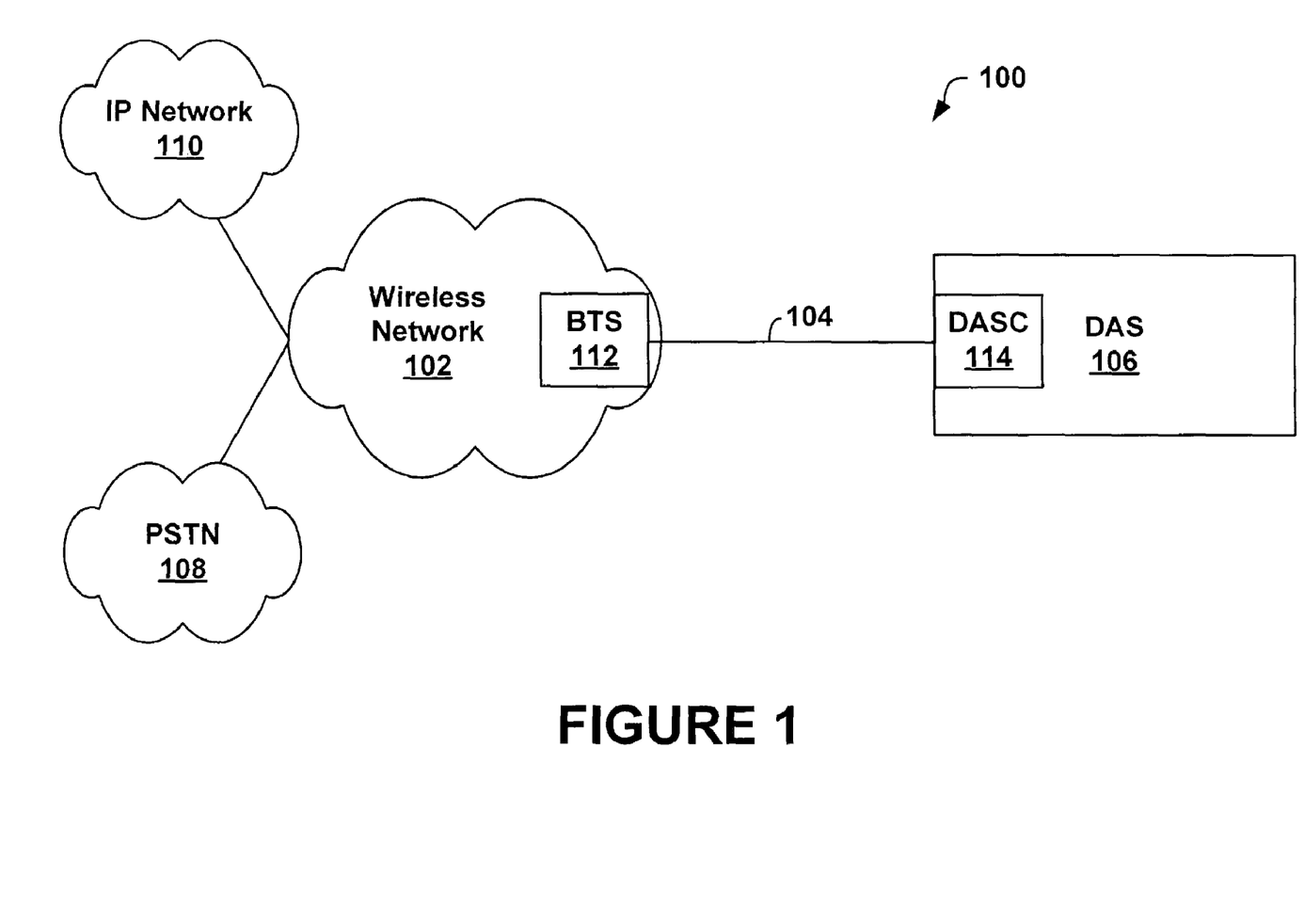
FIG. 1 is a block diagram illustrating one embodiment of a wireless communication system.

Referring now to the figures, FIG. 1 is a block diagram illustrating one embodiment of a wireless communication system 100. The system 100 includes a wireless network 102 coupled via a link 104 to a DAS 106. It should be understood that this and other arrangements described herein are set forth for purposes of example only, and other arrangements and elements can be used instead and some elements may be omitted altogether, for example. Further, many of the elements described herein are functional entities that may be implemented as hardware, firmware or software, and as discrete components or in conjunction with other components, in any suitable combination and location.

The wireless network 102 may be any wireless communications system such as a code division multiple access (CDMA) network, a time division multiple access (TDMA) network or others. The wireless network 100 may comprise (or alternatively provide) connectivity to any transport network, such as the public switched telephone network (PSTN) 108, an Internet protocol (IP) network 10 or others.

The link 104 may be a wired link such as a T1 connection, an Ethernet connection, or a fiber optic connection. Alternatively, the link 104 may be a wireless link that functions according to any known wireless protocol, such as CDMA for example. The link 104 may be established between a base transceiver station (BTS) 112 of the wireless network 102 and a controller of the DAS 106, such as a DASC 114, for example.

The DAS 106 may be any antenna system within the wireless network 102 or the DAS 106 may be simply an extension of the wireless network 102. For example, the DAS 106 may be a distributed wireless antenna system (DWS). Alternatively, the DAS 106 may be separate from the wireless network 102 (as shown) to provide wireless services to areas that the wireless network 102 may not reach.

Figure 2A:
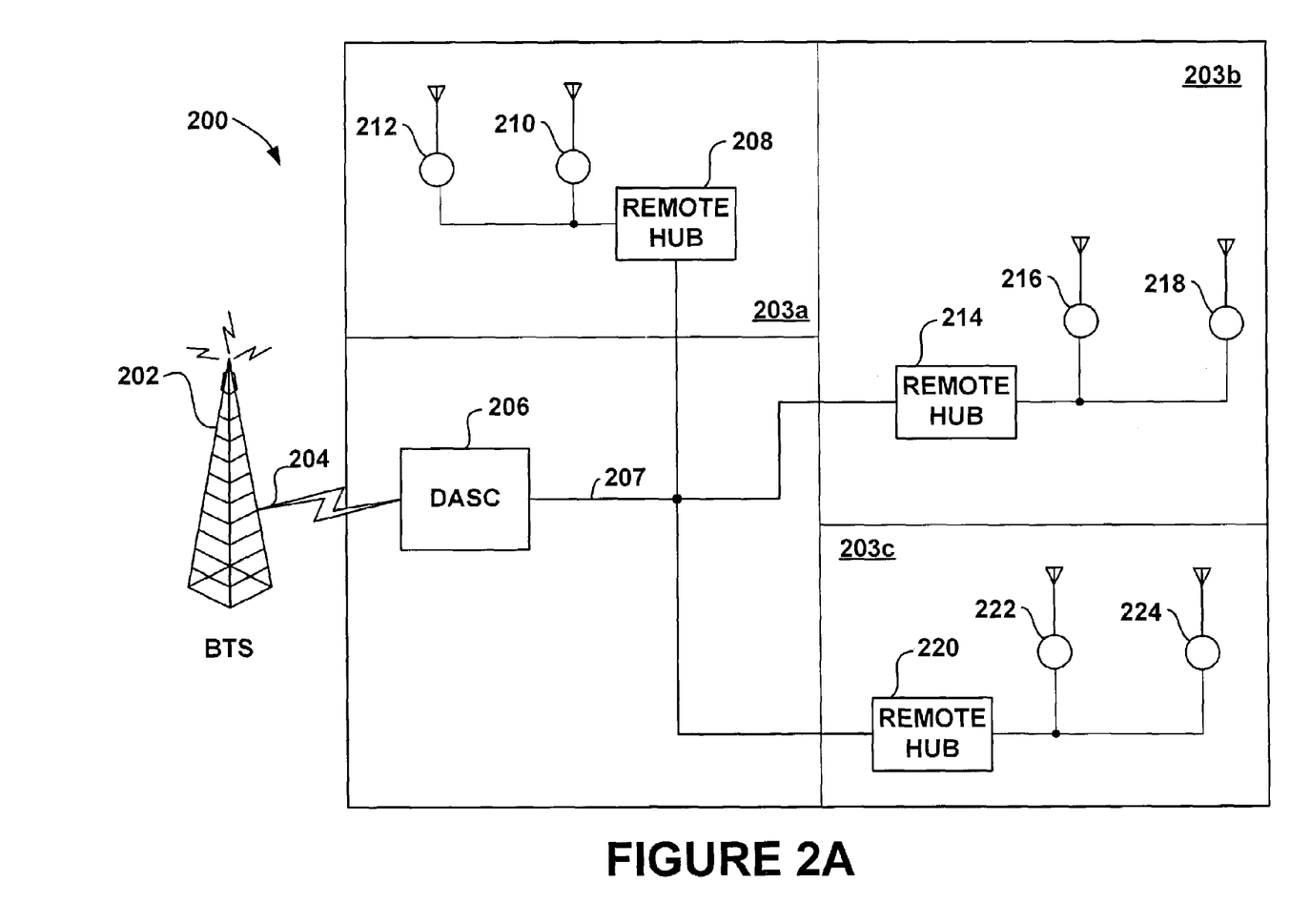
FIG. 2A illustrates one embodiment of a distributed antenna system.
Figure 2B:
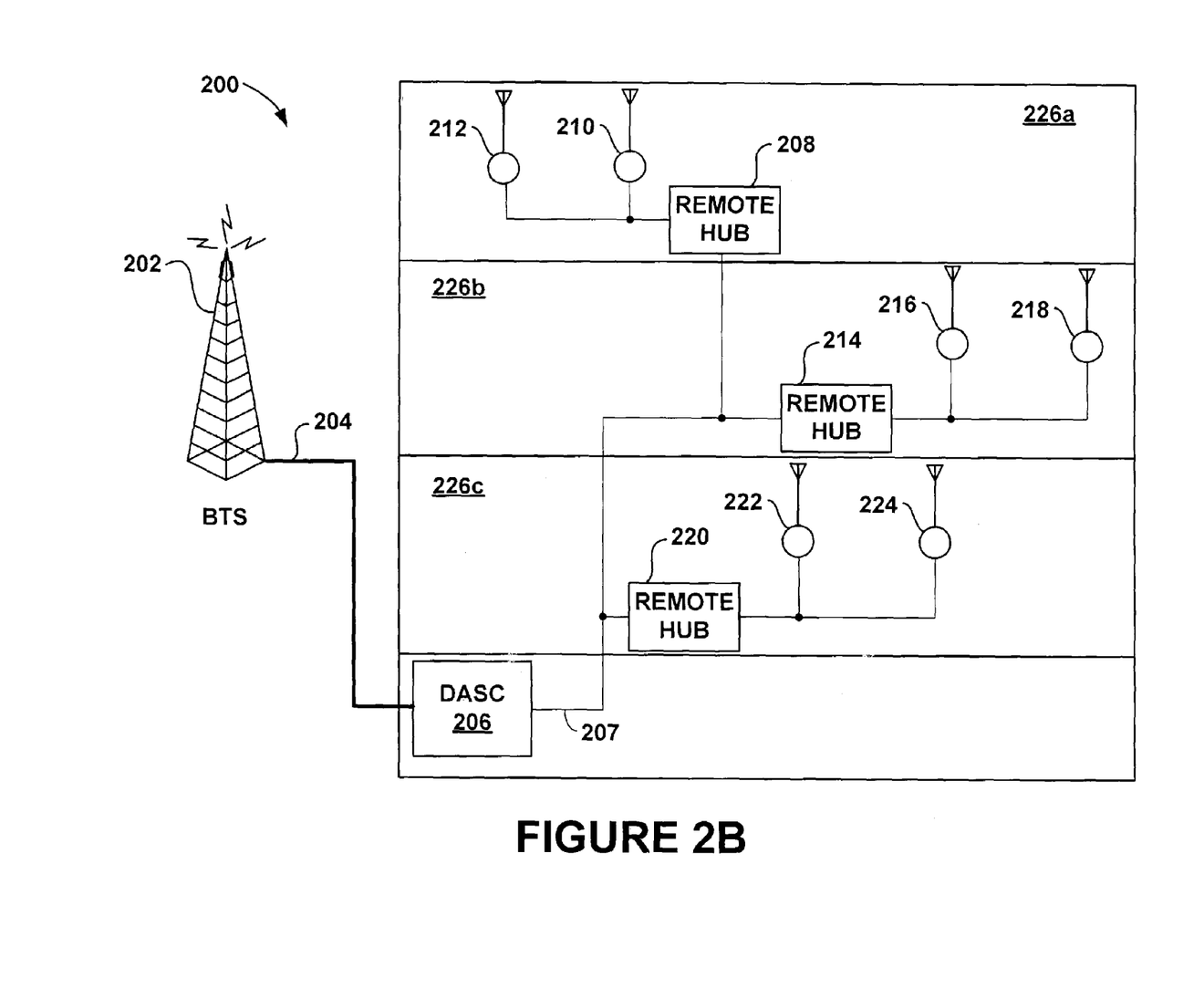
FIG. 2B illustrates another embodiment of the distributed antenna system.

FIG. 2A illustrates one example of a DAS 200. The DAS 200 shown in FIG. 2A comprises, by way of example, an in-building antenna system. The antenna system is shown to span three rooms 203a-c, however the antenna system may extend through any number of rooms. FIG. 2B illustrates another arrangement of the DAS 200. The arrangement of the DAS 200 in FIG. 2B is shown to span three floors 226a-c of a building, however the DAS 200 may extend through any number of floors. Also, it should be understood that the DAS 200 may also be a system for use in any area that a wireless network does not reach, such as for example, any RF blocked area not limited to a building.

Exemplary DAS 200 includes a BTS 202 (of a wireless network) coupled via link 204 to a DASC 206 of the antenna system. In other words, the BTS 202 would be in a location where it could receive signals and pass them on to the antenna system via link 204. The link 204 may be a wireless interface such that the DASC 206 may receive wireless signals from the BTS 202, as shown in FIG. 2A. Alternatively or additionally, the link 204 may be a wired transmission line that may be used to send signals from the BTS 202 to the DASC 206, as shown in FIG. 2B.

The DASC 206 may convert the signals received from the BTS 202 into optical signals and distribute the optical signals via fiber optic cables 207 to remote hubs 208, 214, and 220. Of course, fiber optic cables are not the only example. Infrared laser cables, wireless RF interconnects, coaxial cables, or category 5 twisted pair cables may be used as well. Indeed, those of skill in the art will recognize that any suitable type of transmission media may be used.

The DASC 206 may be in any location within the antenna system, such as a central location as illustrated in FIG. 2A, or within a basement of a building, as illustrated in FIG. 2B. Similarly, the remote hubs 208, 214, and 220 may be positioned in any location in the building, however, it may be desired to position them near the antennas they control.

Each remote hub (208, 214, and 220) controls signal transmission between the DASC 206 and one or more antennas. The remote hubs 208, 214, and 220 couple to their respective group of antennas through fiber optic cables (or other suitable connections). For example, remote hub 208 couples to antennas 210, 212, remote hub 214 couples to antennas 216, 218, and remote hub 220 couples to antennas 222, 224. Each remote hub receives the signals from the DASC 206 and distributes them to the respective antennas. The antennas receive the signals and convert them back to RF signals (if necessary) for wireless transmission in the building.

The antennas 210, 212, 216, 218, 222, and 224 may take any form. For example, they may be indoor antennas such as cable antennas, which may provide wireless services over a small distance, or panel antennas, which are small antennas designed for minimal visual impact. Alternatively, the antennas may be typical outdoor antennas mounted on the roof of the building, for example. Other alternatives comprise an omni antenna or a directional antenna.

The DAS 200 may comprise other elements as well positioned throughout the antenna system, interconnected through fiber optic cables (or other wired links) or through wireless links. For example, additional routers (other than remote hubs) may be interconnected within a group of antennas to route signals accordingly. In addition, the DAS 200 may include wireless repeaters or other transmission and reception equipment to further transmit and receive wireless signals in the antenna system.

B. Configuration of System

A technician can configure the antennas within the DAS 200 in various ways. One technique of obtaining a desired configuration involves performing a test using diagnostic equipment to obtain operational parameters of the DAS 200 so as to determine the arrangement of the antennas and configuration (e.g., radiation pattern) of each antenna within the DAS 200. Any type of wireless signaling diagnostic equipment may perform such a test. One example of a device to record diagnostic measurements is the Agilent Pilot Scanner model number 74XX Series, available from Agilent Technologies in Palo Alto, Calif.

The diagnostic equipment may measure or otherwise acquire any sort of operational parameters of the DAS 200. For example, a diagnostic measurement device may obtain measurements such as a quality of communication, a receive signal power, a transmit signal power, a percent of dropped calls, a percent of call origination/termination failures, $E_c/I_o$ performance (i.e., the energy of the pilot signal versus the total noise on a given channel), and a frame error rate (FER) (or forward and reverse link average FER). The diagnostic equipment may also measure pilot signal strength or determine how many pilots are active (i.e., have a strong signal strength) in an area. Other examples are possible as well.

To perform the test to obtain the operational parameters, an engineer may travel throughout the DAS 200 (for example, room to room or floor to floor) to collect measurements in order to obtain a "footprint" of the DAS 200 by using the Agilent Pilot Scanner (model number 74XX Series), for example. The footprint may be an illustration of the areas of the DAS 200 in which a wireless user can obtain wireless service or the area of the DAS 200 where wireless signals from the antennas can be received. For example, the DAS 200 may provide wireless service to only certain areas of a building, such as within floors that contain antennas, or possibly only within rooms containing antennas. And the footprint can illustrate these areas and can be used to determine where in the building wireless service may need to be improved.

As an example, the engineer may perform a test of devices in a system to develop a footprint as a troubleshooting technique in response to an issue or a complaint of poor wireless service in the system. For example, an area of a building may have had excellent wireless reception, and suddenly all reception may be lost. An engineer may perform a test and determine that RF communication is blocked in an area, possibly because a partition had been installed in a room. Alternatively, a wall (or alternate reconfiguration of a floor layout) may have been removed, causing interference of wireless signals throughout the building. The engineer may perform the test to identify interference between wireless signals by measuring signal strength and identifying degradation in system performance. For example, wireless signals may leak throughout the building now that no wall blocks the signals (causing pilot pollution), which the engineer can measure by determining a number of pilot signals that are present. The engineer may then establish a test result, using a diagnostic measurement device, by determining that a given pilot signal strength should be increased so that this in-building pilot signal becomes the dominant carrier signal.

Figure 3:
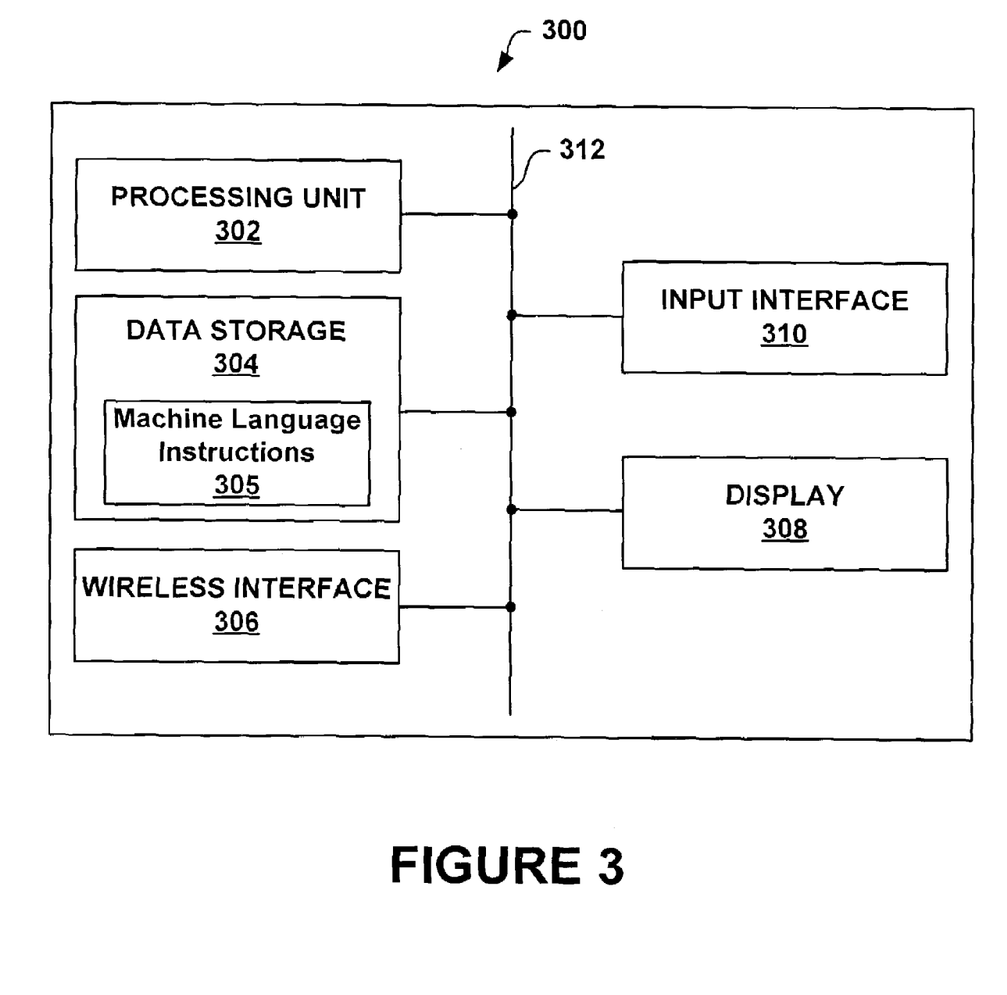
FIG. 3 is a block diagram illustrating one embodiment of a diagnostic measurement device.

FIG. 3 is a block diagram illustrating one embodiment of a diagnostic measurement device (referred to as "DMD") 300. The DMD 300 includes a processing unit 302 (one or more processors), data storage 304, which stores machine language instructions 305, a wireless interface 306, a display 308, and an input interface 310 each interconnected via a bus 312. The DMD 300 may comprise a single test unit that is the size of a personal digital assistant (PDA) or a portable computer, for example. The DMD 300 may also comprise one or more units coupled together, such as a mobile station coupled to a portable computer via a short-range wireless link, for example. Other examples are possible as well.

The processing unit 302 may operate according to an operating system, which may be any suitable commercially available embedded or disk-based operating system, or any proprietary operating system. The processing unit 302 may comprise one or more smaller central processing units, including, for example, a programmable digital signal processing engine. The processing unit 302 may execute the machine language instructions 305 that are stored within the data storage 304. Of course, machine language is an example, since the instructions may be a higher level computer language. Or the logic could take the form of firmware and/or hardware.

The data storage 304 may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile storage systems. However, any type of memory may be used for the data storage.

The processing unit 302 may execute the machine language instructions 305 to implement a software maintenance program to capture system metrics of an antenna system. Examples of such maintenance programs are the Grayson Invex optimization program, available from Technology Rentals & Services in Dallas, Tex., and the Bluerose program available from Willtech International in Seoul, Korea. The machine language instructions 305 may take any form, such as for example, object-oriented machine language instructions, such as the C++ programming language. However, other programming languages (such as the C programming language for instance) could be used as well.

The wireless interface 306 may include an antenna, a transmitter and a receiver, which each may comprise any number of components that enable the DMD 300 to transmit and receive wireless signals. The receiver may be a rake receiver to capture wireless signals within a CDMA network, for example. In the embodiment where the DMD 300 comprises multiple components coupled together, such as a cellular telephone coupled to a portable computer, the wireless interface may reside in the cellular telephone. The wireless interface 306 may operate according to any known wireless protocol, such as CDMA for example. Additionally, the wireless interface 306 may employ any carrier frequency (or simply carrier) to transmit wireless signals.

The display 308 and the input interface 310 allow an engineer to control operation of the DMD 300. The display 308 may be any type of display, such as a liquid crystal display (LCD) or other types of display screens. And the input interface 310 may be any type of interface, such as a keypad, which allows the engineer to enter commands to control operation of the DMD 300. The interface 310 may also include a mouse or a touch screen, for example.

C. Remote Communication

According to an exemplary embodiment, the DMD 300 may allow an engineer to remotely communicate with devices of a communication system, such as a DAS, by using the wireless interface 306, rather than by physically connecting to the devices of the system. For example, an engineer in the "field" (i.e., within the coverage areas of the system) may perform a test of the configuration of devices of the system and wirelessly send a control signal to cause the device's configurations to be adjusted as desired.

Figure 4A:
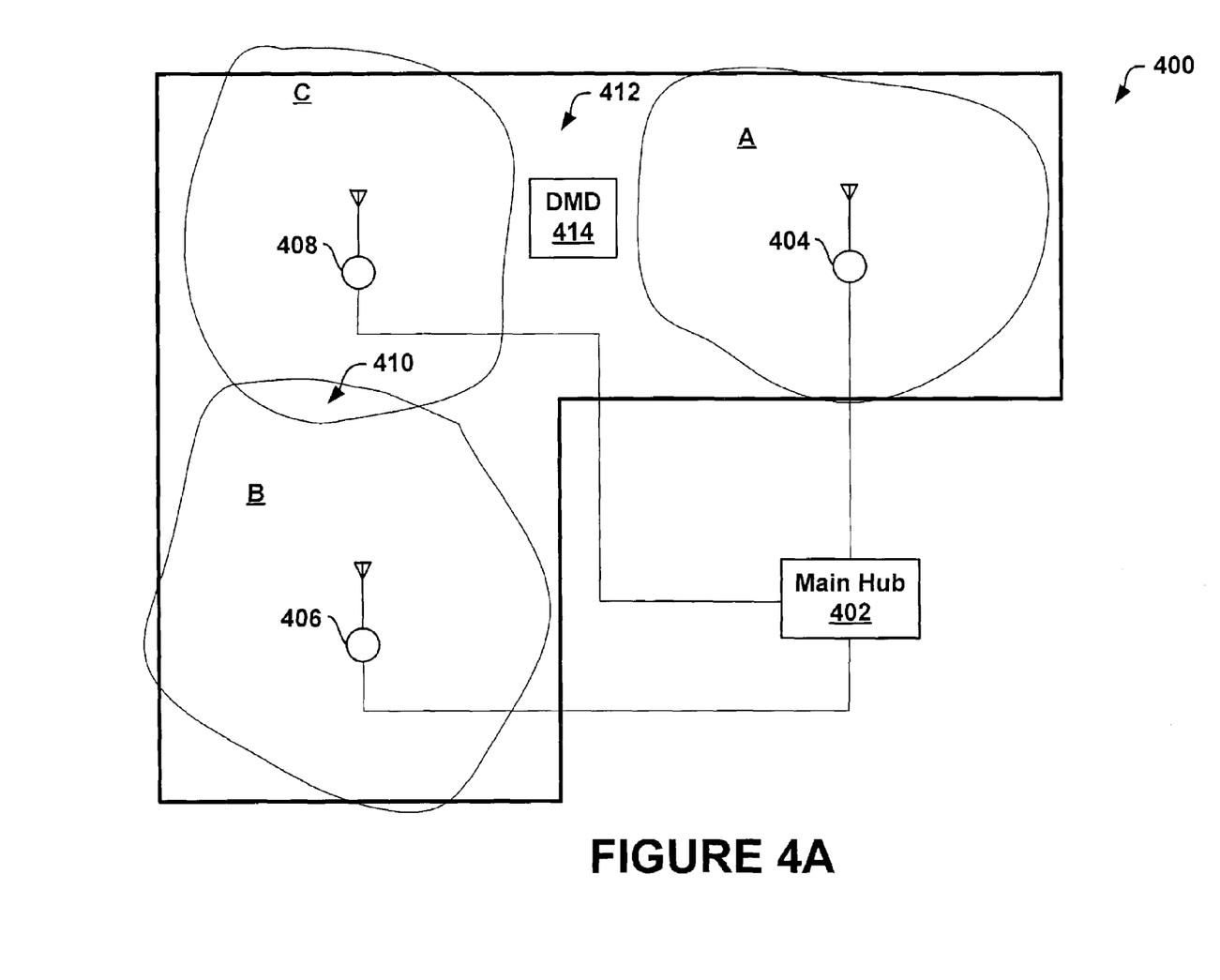
FIGS. 4A-4C illustrate one embodiment of operation of the diagnostic measurement device of FIG. 3.
Figure 4B:
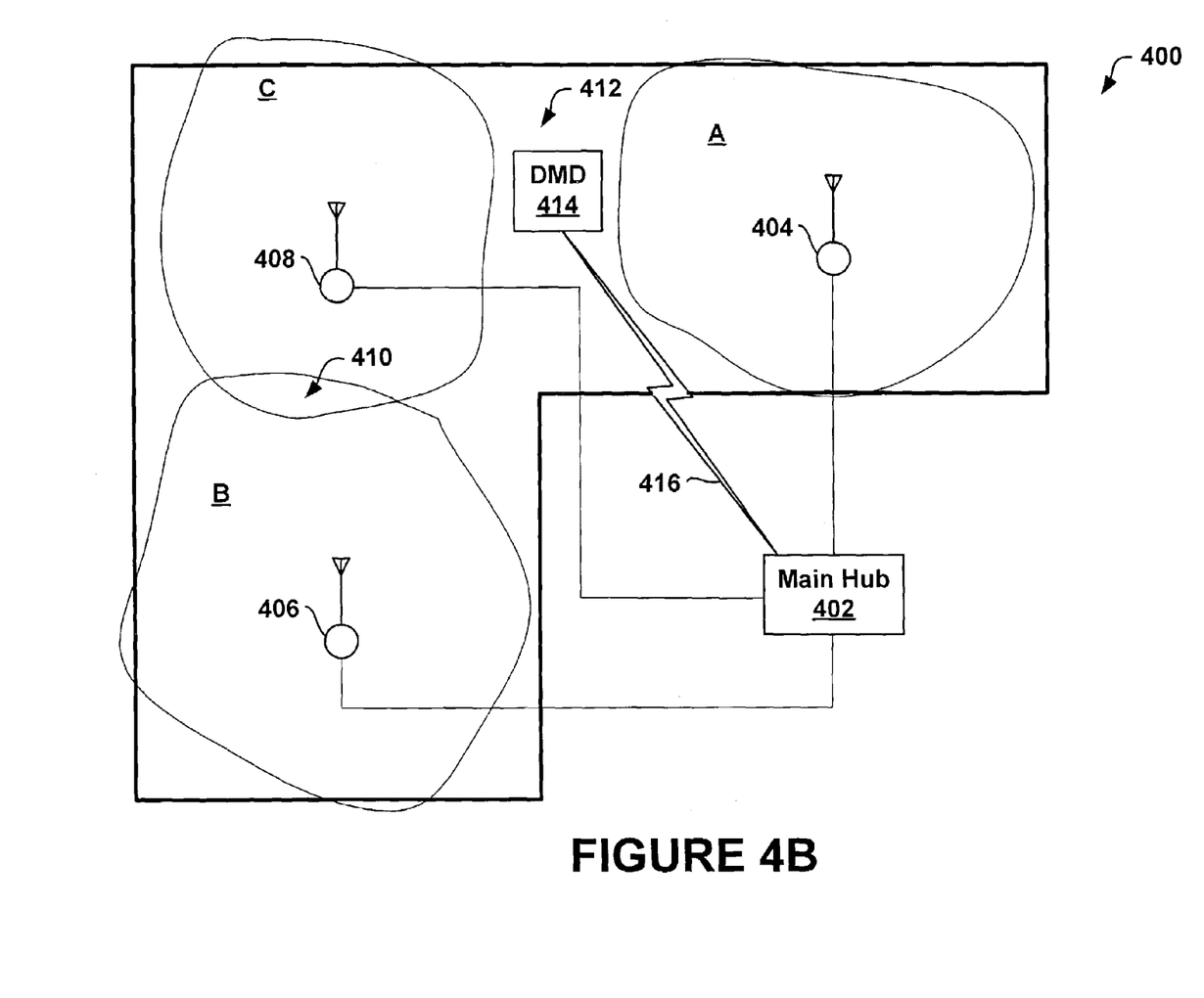
Figure 4C:
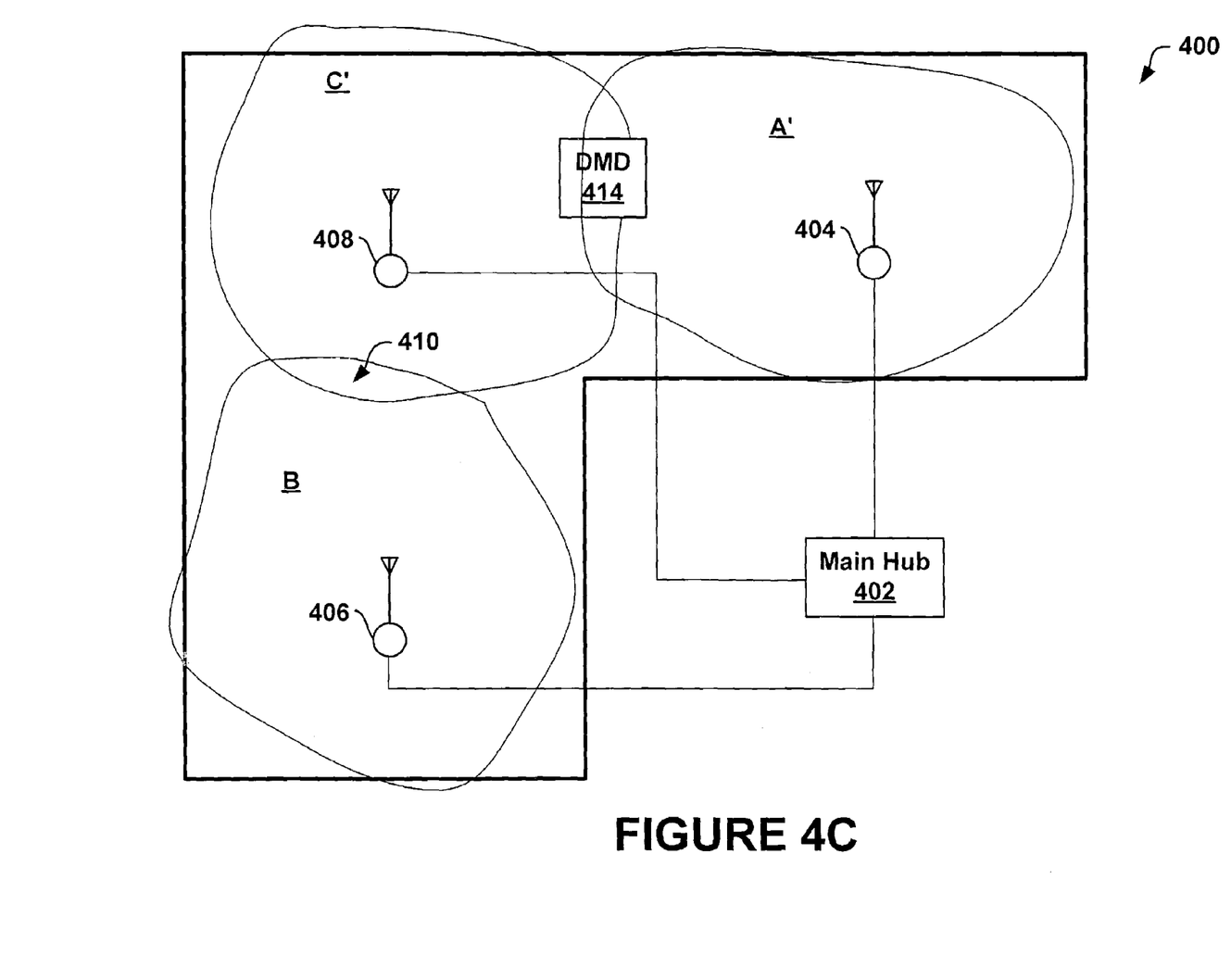

FIGS. 4A-4C illustrate one embodiment of operation of the DMD 300. FIG. 4A illustrates a system for adjusting the configuration of a device of an in-building DAS 400. The DAS 400 may include a main hub 402 coupled to antennas 404, 406, and 408 via fiber optic cables. The main hub 402 within the DAS 400 may be a DASC or a remote hub as illustrated within FIGS. 2A and 2B, or any other antenna controller.

Each antenna produces a radiation pattern that comprises an air interface that defines a respective coverage area for the antenna. When a mobile station is positioned within such a coverage area of an antenna, the air interface provides a communication path between the mobile station and the antenna. FIG. 4A illustrates antenna 404 with coverage area A, antenna 406 with coverage area B, and antenna 408 with coverage area C. Since the antennas 404, 406, and 408 may take a variety of forms, the coverage areas may be any shape or size and directed in any desired direction. Therefore, antennas 404, 406, and 408 can provide coverage areas that have any configuration. For example, coverage areas B and C have an overlapping area 410, which may desirably provide redundant coverage areas for wireless users. Alternatively, a coverage area gap 412 is present between coverage areas A and C.

To perform a test of the configuration of the DAS 400, an engineer may position a DMD 414 within the coverage areas of each antenna and measure signal power levels, calculate signal error rates, identify pilot signals, or obtain other operational parameters of the antennas. The Agilent Pilot Scanner (model number 74XX Series), can measure such parameters, and in one example, the DMD 414 may be a device similar to the Agilent device, at least in that the DMD 414 can also measure such parameters. The DMD 414 may sample the RF environment and demodulate captured signals to measure these system metrics.

One example of measuring system metrics with the DMD is to identify all available pilot signals in a given area to determine if the area has "pilot pollution". In a CDMA network, for example, each channel in a CDMA signal is spread by one of 64 orthogonal codes called Walsh codes. The Walsh codes spread the signal over a bandwidth range of approximately 1.25 MHz. Most of the Walsh codes are used for voice traffic channels. The other codes are dedicated to pilot, paging, and sync channels. The pilot channel (Walsh code 0) is an unmodified version of a short code. The short code is a pseudo-random sequence that can be identical for all transmitting antennas in a network, except that each antenna may have a different phase-delayed version of the short code. This is usually represented as a time shift measured in chips. (A chip is approximately 0.8 microseconds.) The time offset in the short code is what uniquely identifies each antenna. It is this pilot channel timing offset that is used by a mobile phone to identify a particular antenna, distinguish it from the others, and thereby communicate with the proper antenna.

The pilot channel timing offset is expressed as a "PN offset" (pseudo noise offset) referenced to absolute time. PN 0 aligns with the beginning of the short code period, PN 1 is advanced in timing by 64 chips, PN 2 is 128 chips higher than PN 0, and so on. The rake receiver of the DMD can have three fingers (e.g., correlators) that are used either to demodulate up to three different pilots, or to demodulate up to three multipath components of the same pilot. The rake receiver distinguishes between different pilot signals using the PN offsets. If more than three significant pilots are presented to the rake receiver (which only has three fingers) at one time, the DMD cannot distinguish between them. The presence of a high-level fourth or fifth pilot results in higher levels of $I_o$ (e.g., total noise on a given channel), and consequently worse $E_c/I_o$. The result of all of these conditions is often higher FER or a potential increased dropped-call rate. More than three significant pilot signals is a form of interference in CDMA networks referred to as pilot pollution. The DMD, therefore, can perform a test of the configuration of the DAS 400 to determine if the DAS has pilot pollution.

As an example of performing the test, as illustrated in FIG. 4A, the DMD 414 can be placed between antennas 404 and 408 to identify pilot signals present or determine wireless signal strength at that location, as done conventionally by the Agilent Pilot Scanner (model number 74XX Series). A processing unit within the DMD 414 may execute machine language instructions to perform a test of the configuration of the antennas. The DMD 414 may run a software program to capture service data and derive operational measurements from system metrics, such as from power levels measured. To capture service data, the DMD 414 may measure pilot signals radiated from the antennas 404, 406, and 408, and determine whether a user of a mobile station located between antennas 404 and 408 would be able to obtain wireless service (i.e., communicate wirelessly) within the building. If the pilot signal strength is too low (compared to conventional levels), a mobile station probably will not recognize the pilot signal and, therefore, will not be able to communicate with the antennas to send and to receive wireless signals. In addition, if too many pilot signals are present (compared to conventional standards), the mobile station will not be able to distinguish between them in order to communicate with the antenna.

An engineer operating the DMD 414 may establish a test result, i.e., adjustments necessary, by comparing the measurements recorded with desired operational parameters of the DAS 400 and calculating adjustments that should be made to the configuration of the DAS 400 so that the DAS 400 will operate according to the desired operational parameters. Alternatively, the DMD 414 itself may establish the test result by performing the above tasks.

The desired operational parameters are generally defined by installation and design standards based on operational requirements for mobile stations. Examples of some desired operational parameters for a CDMA network are approximately 2% of dropped or blocked calls, $E_c/I_o$ ratio greater than −13 (i.e., the energy of the pilot signal versus the total noise on a given channel), and less than 1% of call origination failures.

Desired operational parameters may also be determined from theoretical calculations of the system's design, which may vary according to the type and quality of equipment employed in the system. For example, a traffic analysis study of wireless traffic within the building can be completed based on capacity requirements from equipment specifications to determine desired operational parameters, such as antenna radiation power levels.

As one example, the engineer may determine that the pilot signal strength is unacceptable and if any additional adjustments of the antennas 404 and 408 are necessary, by analyzing the operational parameters to compare them with desired parameters. The engineer (or the DMD 414) may then determine that the antennas 404 and 408 should transmit at higher power levels to increase the pilot signal's strength to provide larger coverage areas to eliminate or lessen the coverage area gap 412. The engineer may also determine that the antennas 406 and 408 should transmit at lower power levels to lessen or eliminate the overlapping area 410 (if that is desirable).

The engineer may then cause the DMD 414 to establish a wireless link 416 with the main hub 402 (or possibly with the antennas 404 and 408 or a BTS (not shown)) to remotely communicate with the main hub 402. Alternatively, the DMD 414 could establish test results and autonomously (rather than with engineer directive) establish the wireless link 416 with the main hub 402 and send a control signal to the main hub 402 in response to the test results.

The main hub 402 may include a wireless interface that has an antenna, a receiver and possibly a transmitter that may function to create the wireless link 416 between the main hub 402 and the DMD 414. As mentioned, the DMD 414 may use any type of wireless communication technique to remotely communicate with the main hub 402. For example, the DMD 414 may establish a "3G" CDMA link with the main hub 402. In addition, the DMD 414 may use any portion of the RF spectrum to transmit wireless signals to the main hub 402. For example, the DMD 414 may use a radio frequency within the public frequency or a radio frequency within a licensed in-band frequency to transmit wireless signals.

The DMD 414 may then wirelessly send a control signal to the main hub 402 of the DAS 400 to instruct the main hub 402 to reconfigure the DAS 400 accordingly. And the main hub 402 will receive the control signal through its wireless interface, and then possibly alter an amount of power delivered to antennas 404 and 408 in order to alter the antennas' transmission power levels, as instructed by the control signal, thus reconfiguring the DAS 400.

The main hub 402 may receive the wireless control signal in other ways as well. For example, in an alternative embodiment, the DMD 414 may send the control signal wirelessly to a BTS in a manner as a mobile station conventionally communicates with BTSs. The BTS is coupled to the main hub 402 via the fiber optic cables, or other wired media, and may receive the wireless control signal from the DMD 414, convert it into a fiber optic signal, and send the fiber optic signal to the main hub 402 via fiber optic cables. In still another embodiment, the DMD 414 may wirelessly send the control signal to a repeater (not shown) positioned within the DAS 400, which can either repeat the wireless signal to the main hub 402 or convert the wireless signal into a wired signal and send the wired signal to the main hub 402 via wired media. In yet another embodiment, the DMD 414 may wirelessly send the control signal to any one (or more) of antennas 404, 406 and 408. The antenna(s) may receive the wireless signal, convert it into a wired control signal (e.g., a fiber optic signal) and send the wired control signal to the main hub 402 via wired media. Other examples are possible as well.

FIG. 4C illustrates an example of reconfigured coverage areas of the DAS 400 in response to the wireless control signal. Antenna 404 may now produce a radiation pattern defining coverage area A' and antenna 408 may now produce a radiation pattern defining coverage area C'. The distinction between FIGS. 4B and 4C is that the coverage areas A' and C' now overlap to eliminate the coverage area gap that was present.

The engineer may now wish to verify that the receive power level is acceptable (or that the coverage areas were properly reconfigured) after the antennas' 404 and 408 transmission power levels have been reconfigured, for example. To do this, the engineer may simply take a second measurement or perform a second test while still located within the given coverage area. Therefore, after sending the wireless control signal to the main hub 402, the engineer may then perform the second test without moving positions. The second test may reflect the changes indicated by the previously transmitted control signal. The ability to wirelessly modify the DAS 400 configuration allows the engineer in the coverage areas of antennas to promptly verify if the changes were successful. And, if the second test indicates that the changes were not successful, the engineer may wirelessly send another control signal to the main hub 402 to correct any additional adjustments of the DAS 400. Using this method, the engineer may efficiently modify a configuration of the DAS 400 using an iterative technique, for example. And, after reconfiguring a portion of the DAS 400, the engineer may simply travel to another location of the DAS 400 to complete a reconfiguration of the entire DAS 400.

Figure 5:
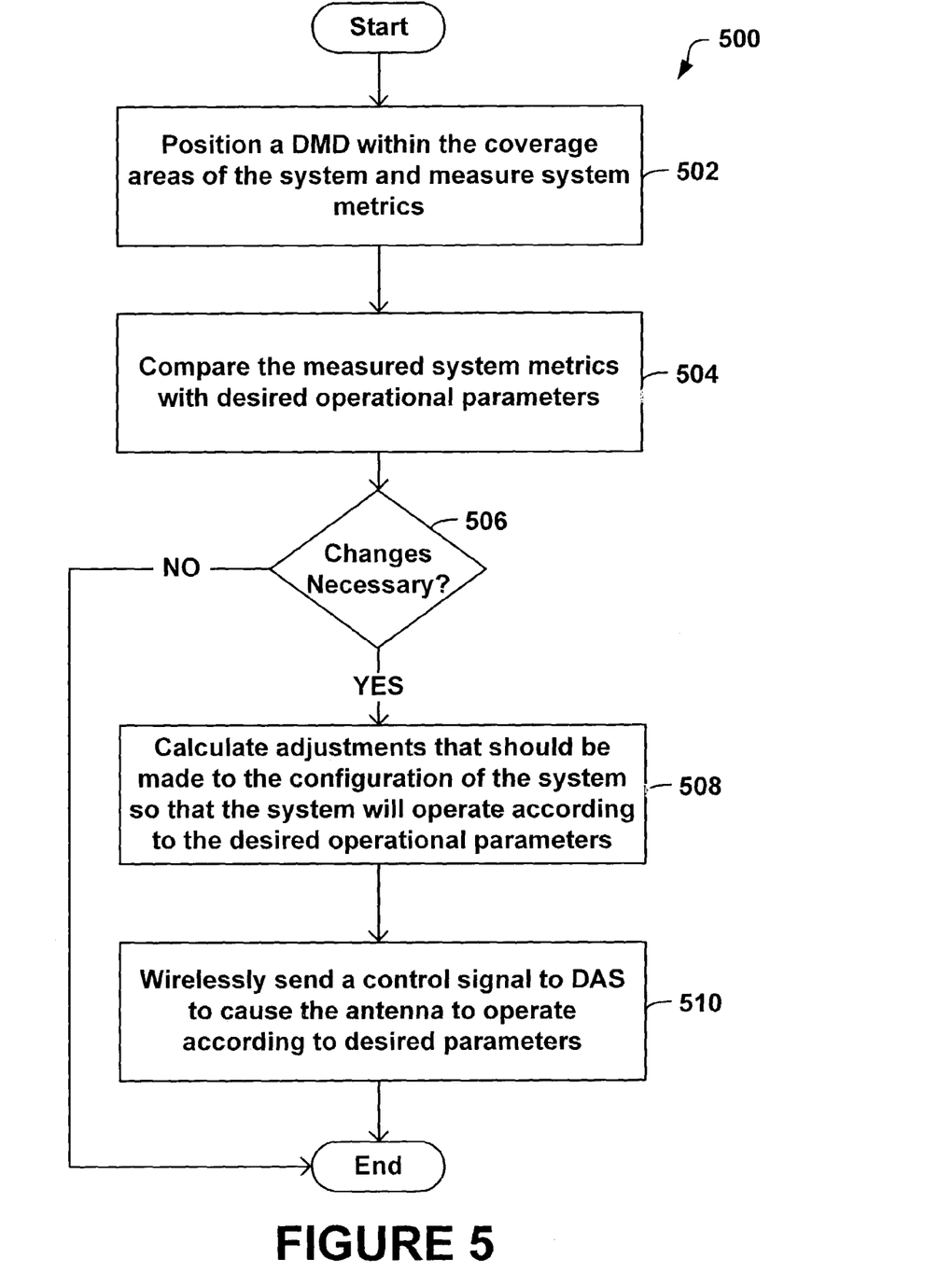
FIG. 5 is a flowchart depicting functional blocks of a method of performing a test of a configuration of at least one device and establishing a test result according to one embodiment.

FIG. 5 is a flowchart depicting functional blocks of a method 500 of performing a test of a configuration of at least one device of a communication system, such as antenna 404, and establishing a test result. Initially, as shown at block 502, an engineer may position the DMD 414 within the coverage areas of a wireless communication system and then measure system metrics. For example, the engineer may position the DMD 414 between the two antennas 404 and 408 of the DAS 400 to measure system metrics such as pilot signal strength. The engineer may then compare the measured system metrics with desired operational parameters, as shown at block 504.

As shown at block 506, the engineer can then determine if any changes to the system are necessary. If not, the engineer may perform a test elsewhere in the system. If changes are necessary, the engineer (or the DMD 414) may then calculate adjustments that should be made to the configuration of the system so that the system will operate according to the desired operational parameters, as shown at block 508. The engineer may then cause the DMD 414 to wirelessly send a control signal to the DAS 400 to cause the antenna 404 to operate according to desired parameters, as shown at block 510.

Figure 6:
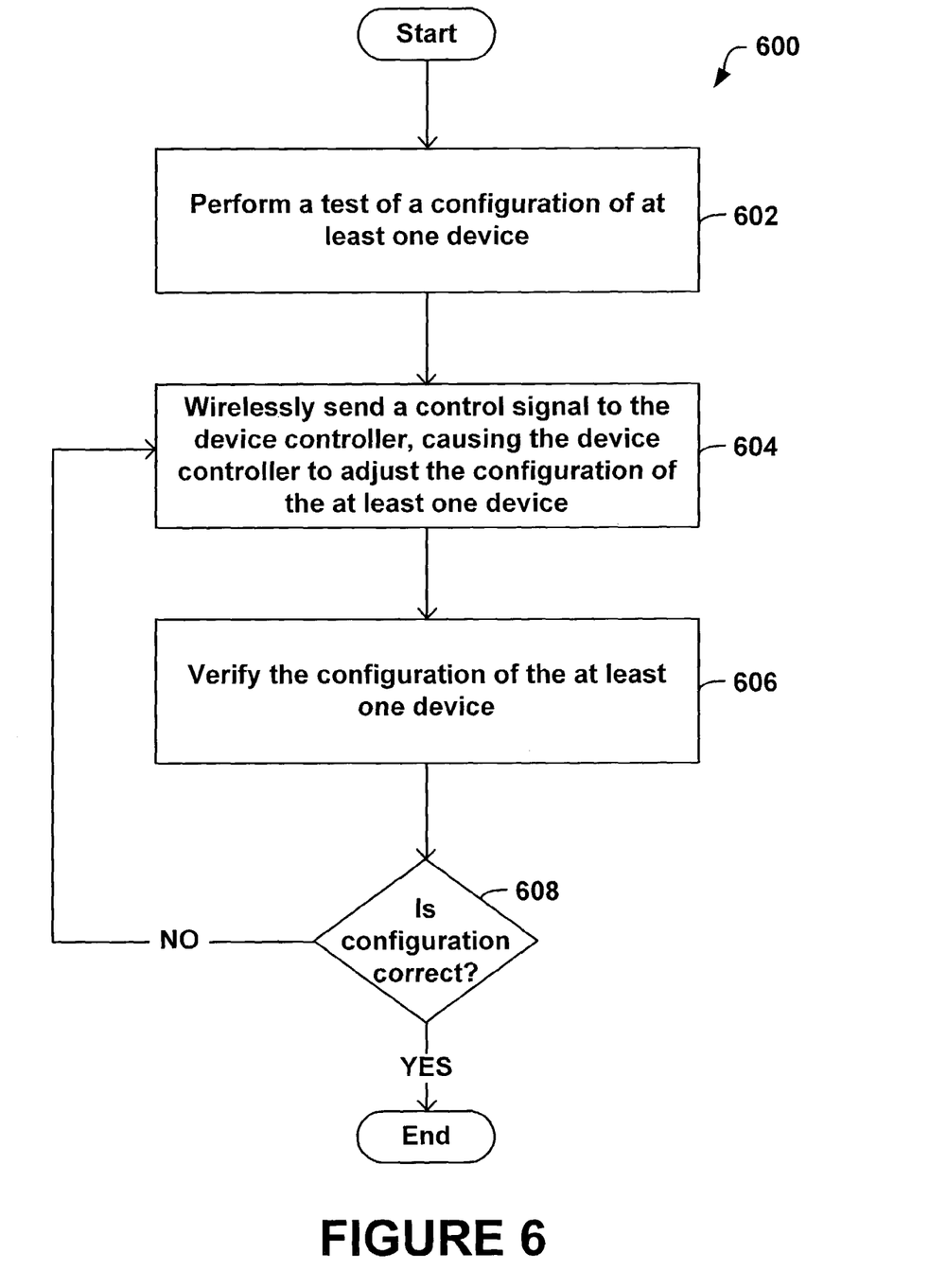
FIG. 6 is a flowchart depicting functional blocks of a method of reconfiguring a device of a wireless system according to one embodiment.

FIG. 6 is a flowchart depicting functional blocks of a method 600 of reconfiguring a device, such as antenna 404, of a wireless communication system according to an exemplary embodiment of the present invention. Initially, as shown at block 602, an engineer may perform a test of a configuration of at least one device of the system. For example, in the DAS 400, an engineer may perform a test of the configuration of antennas using the DMD 414. Or, within a telecommunications system, an engineer may perform a test of the configuration of a repeater or of BTSs, for example. The engineer may perform the test by measuring wireless signal power levels while within the coverage area(s) of the device. The engineer may measure other system metrics as well to determine if any changes to the configuration are desired as explained above with reference to FIG. 5.

The engineer may perform the test of devices in a system in order to optimize the configuration of the system. For instance, a system will be initially configured according to a design layout that was calculated according to equipment specifications. However, a design layout may not be able to provide the most optimal configuration due to changes in a building or imprecision's of operation of equipment. Therefore, optimization of the design is desirable to achieve optimal system performance within the given network configuration. And optimization may be achieved through an iterative process of testing the system and adjusting the system accordingly. In addition, a system can be optimized after modifications are made to the system, such as after adding additional antennas or "building-out" the system.

Returning back to FIG. 6, block 604 illustrates that the engineer may cause the DMD 414 to wirelessly send a control signal to a controller of the device, causing the controller to adjust the configuration of the device. For example, in the DAS 400, a device controller, such as the main hub 402, may control devices within the DAS 400, such as remote hubs and antennas, and the DMD 414 may wirelessly send the control signal to the main hub 402, causing the main hub 402 to adjust the configuration of the remote hubs or antennas according to results of the test. The main hub 402 may receive the control signal, convert it to an optical signal, and then distribute the optical signal via the fiber optic cables to the remote hubs that control the antennas, which may be reconfigured. The remote hubs may then alter an amount of power delivered to an antenna to adjust the configuration of the antenna's coverage area. As another example, to reconfigure a wireless repeater, the DMD 414 may wirelessly send a control signal to a device controller within the wireless repeater, such as a processing unit within the wireless repeater, which may adjust the configuration of the wireless repeater (to repeat only desired signals or to direct the repeater to transmit in a desired direction, for example).

The control signal may take any form. The DMD may form the control signal according to the type of device controller that receives the control signal. For example, in a DAS arrangement, the DMD may include a remote hub identifier in the control signal to address the control signal to a particular remote hub, enabling the DASC to properly route the signal. And each remote hub typically controls multiple antennas. Therefore, the DMD may also include an antenna identifier (e.g., antenna address) within the control signal so that the remote hub may reconfigure the desired antenna coverage area. An example control signal will indicate an antenna address, the antenna's function to be modified, and the modifications of the indicated function.

The device controller that receives the control signal may send a confirmation signal to the DMD after the modifications have been completed. The confirmation signal may simply indicate whether or not the desired modifications were successfully made. If the DMD receives a confirmation signal indicating that the modifications were not made, the engineer may then cause the DMD to resend the control signal to the device controller.

As shown at block 606, the engineer may verify the configuration of the device. For example, the engineer may take a second measurement after the device has been reconfigured to determine whether a receive signal power level is now sufficient. The engineer may then determine if the configuration is now correct, as shown at block 608. To determine if the configuration is now correct, the engineer may compare the previous signal power level to the current signal power level. If the configuration is correct (e.g., the current signal power level is acceptable), the engineer may move to another area of the system to continue optimization of the system. However, if the configuration is not correct (e.g., the receive signal power level is still too low or possibly too high) then the engineer may wirelessly send another control signal to cause the configuration of the device to change accordingly.

Performing subsequent tests may simplify troubleshooting techniques for the engineer. As an example, an engineer may be attempting to determine why wireless service is unavailable in a given area. The engineer may adjust an antenna's transmission power level near the given area to reconfigure its coverage area and, by doing so, the engineer may have then narrowed the problem area (by eliminating coverage area gaps for instance), which will help troubleshooting within the area.

Employing methods of the present invention allows an engineer to efficiently reconfigure an arrangement of a wireless system. The ability to perform a test and remotely make adjustments according to the test without changing positions may reduce the time required to reconfigure a system.

Although the foregoing description focuses mainly on reconfiguring devices of a DAS, representative of a micro-network, the present invention is not limited to operation within a micro-network. The present invention may be performed within any communications system, such as within a macro-network. For example, antennas of BTSs within a macro-network may be reconfigured according to the method presented herein. In another sense, BTSs of the macro-network may be reconfigured according to the methods presented herein by performing a test of the BTSs to obtain operational parameters and, if any adjustments are necessary, a control signal may be wirelessly sent to a base station controller (BSC), which may control operation of a group of BTSs, in order to reconfigure the group of BTSs. Other examples are possible as well.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A distributed antenna system comprising:
    a plurality of antennas; and
    a distributed antenna system controller coupled to the plurality of antennas and operable to receive a wireless control signal causing the distributed antenna system controller to adjust a configuration of the plurality of antennas, and wherein the wireless control signal includes an identifier indicating to the distributed antenna system controller which antenna of the plurality of antennas to reconfigure; and
    a plurality of remote hubs enabling communication between the distributed antenna system controller and the plurality of antennas, wherein each remote hub is coupled to at least one antenna of the plurality of antennas,
    wherein the distributed antenna system controller converts the wireless control signal into an optical control signal and sends the optical control signal to one of the plurality of remote hubs, wherein the one of the plurality of remote hubs adjusts the configuration of antenna identified in the wireless control signal.

2. The distributed antenna system of claim 1, wherein the distributed antenna system controller includes a wireless interface being operable to receive the wireless control signal.

3. The distributed antenna system of claim 1, further comprising a wireless repeater coupled to the distributed antenna system controller, wherein the wireless repeater receives the wireless control signal and sends the wireless control signal to the distributed antenna system controller.

4. The distributed antenna system of claim 1, further comprising a base station transceiver coupled to the distributed antenna system controller, wherein the base transceiver station receives the wireless control signal, converts the wireless control signal to a wired control signal and sends the wired control signal to the distributed antenna system controller.

5. The distributed antenna system of claim 1, wherein one of the plurality of antennas receives the wireless control signal, converts the wireless control signal to a wired control signal and sends the wired control signal to the distributed antenna system controller.

6. In a distributed antenna system comprising a plurality of antennas and a distributed antenna system controller coupled to the plurality of antennas via a plurality of remote hubs, wherein each remote hub is coupled to at least one antenna of the plurality of antennas, a method comprising:

performing a first test of a configuration of at least one of the plurality of antennas and establishing a first test result; and in response to the first test result, wirelessly sending a control signal to the distributed antenna system controller, causing the distributed antenna system controller to adjust the configuration of the at least one of the plurality of antennas so as to establish a reconfiguration of the distributed antenna system wherein the wireless control signal indicates to the distributed antenna system controller which antenna of the plurality of antennas to reconfigure, and wherein the distributed antenna system controller causes a remote hub that is coupled to the indicated antenna to adjust the configuration of the indicated antenna.

7. The method of claim 6, further comprising performing a second test of the configuration of the at least one of the plurality of antennas so as to verify the reconfiguration of the distributed antenna system.

8. The method of claim 7, further comprising establishing a second test result of the second test and determining if the reconfiguration of the distributed antenna system is optimal.

9. The method of claim 8, wherein determining if the reconfiguration of the distributed antenna system is optimal comprises comparing the second test result with a desired test result.

10. The method of claim 8, further comprising wirelessly sending a second control signal to the distributed antenna system, causing the distributed antenna system controller to readjust the configuration of the at least one of the plurality of antennas if the reconfiguration of the distributed antenna system is not optimal.

* * * * *